US 8,081,656 B2

(12) United States Patent
Rodgers

(10) Patent No.: US 8,081,656 B2
(45) Date of Patent: *Dec. 20, 2011

(54) PROCESSING DATA PACKETS USING NAVIGATIONAL HARDWARE ASSIST

(75) Inventor: Steve Walter Rodgers, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/874,940

(22) Filed: Sep. 2, 2010

(65) Prior Publication Data

US 2010/0329251 A1 Dec. 30, 2010

Related U.S. Application Data

(63) Continuation of application No. 11/273,282, filed on Nov. 14, 2005, now Pat. No. 7,792,144.

(51) Int. Cl.
H04J 3/16 (2006.01)
H04J 3/24 (2006.01)
H04N 7/16 (2011.01)

(52) U.S. Cl. ......... 370/466; 370/469; 370/474; 725/139

(58) Field of Classification Search .......... 370/465–469, 370/498, 508, 516–519, 474, 535–544; 328/33, 328/35, 40, 92, 98, 108, 124; 725/89, 100–101, 725/110, 131, 134, 139, 142, 145, 151
See application file for complete search history.

(56) References Cited

U.S. PATENT DOCUMENTS

| | | | |
|---|---|---|---|
| 5,864,682 A * | 1/1999 | Porter et al. | 709/247 |
| 6,359,911 B1 | 3/2002 | Movshovich et al. | |
| 6,438,145 B1 * | 8/2002 | Movshovich et al. | 370/536 |
| 6,453,115 B1 | 9/2002 | Boyle | |
| 6,463,059 B1 | 10/2002 | Movshovich et al. | |
| 6,584,152 B2 * | 6/2003 | Sporer et al. | 375/240.01 |
| 6,792,433 B2 * | 9/2004 | Cornog et al. | 707/737 |
| 6,823,131 B2 | 11/2004 | Abelard et al. | |
| 7,349,395 B2 | 3/2008 | Liu et al. | |
| 7,349,428 B2 | 3/2008 | Hulmani et al. | |
| 7,424,209 B2 * | 9/2008 | Mazur | 386/330 |
| 7,574,102 B2 * | 8/2009 | Kelly et al. | 386/278 |
| 7,730,515 B1 * | 6/2010 | MacCormack et al. | 725/139 |
| 7,792,144 B2 * | 9/2010 | Rodgers | 370/466 |
| 2006/0136768 A1 | 6/2006 | Liu et al. | |
| 2006/0136981 A1 | 6/2006 | Loukianov | |
| 2008/0101772 A1 * | 5/2008 | Green | 386/124 |
| 2009/0282444 A1 * | 11/2009 | Laksono et al. | 725/89 |

* cited by examiner

*Primary Examiner* — Tri H Phan
(74) *Attorney, Agent, or Firm* — McAndrews, Held & Malloy, Ltd.

(57) ABSTRACT

Herein described is a system and method for improving the performance in which data packets are processed in a set-top-box. The system determines and stores one or more values into a memory. The one or more values in memory are subsequently utilized when a firmware is executed. These values are used to efficiently index locations within one or more data packets, such that processing performance is improved. Based on the types of packets received by the set-top-box, the hardware assistance provided by the system may be gradually increased or attenuated to optimize the performance in which the data packets are processed. The method involves determining the one or more values, storing the one or more values in a memory, and using said one or more values to effectively index one or more data fields in the one or more data packets.

27 Claims, 6 Drawing Sheets

PROCESSING DATA PACKETS USING NAVIGATIONAL HARDWARE ASSIST

CROSS-REFERENCE TO RELATED APPLICATIONS/INCORPORATION BY REFERENCE

This Application is a continuation of U.S. patent application Ser. No. 11/273,282, filed on Nov. 14, 2005.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When digital multimedia is received and processed by a set-top-box, hardware and firmware may be used to decode and de-multiplex the received digital multimedia data stream into video and audio component data streams. The hardware and firmware must provide adequate processing performance as the data rate of the received multimedia data increases. The firmware may utilize one or more data fields in the received multimedia data, in order to properly display such multimedia content to a user. Unfortunately in some instances, the time it takes the firmware to access and process the one or more data fields may affect throughput, such that the multimedia content may not be properly displayed to the user. For example, the firmware may be involved in parsing the data to locate the one or more data fields in the multimedia data. In another example, the firmware may need to wait for a particular byte to arrive before processing may commence. In either case, the processing time may be increased and the throughput may suffer, ultimately reducing the performance of the set-top-box.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide at least a system and a method that increases the processing performance of a set-top-box. The various aspects of the invention are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Figure 1:
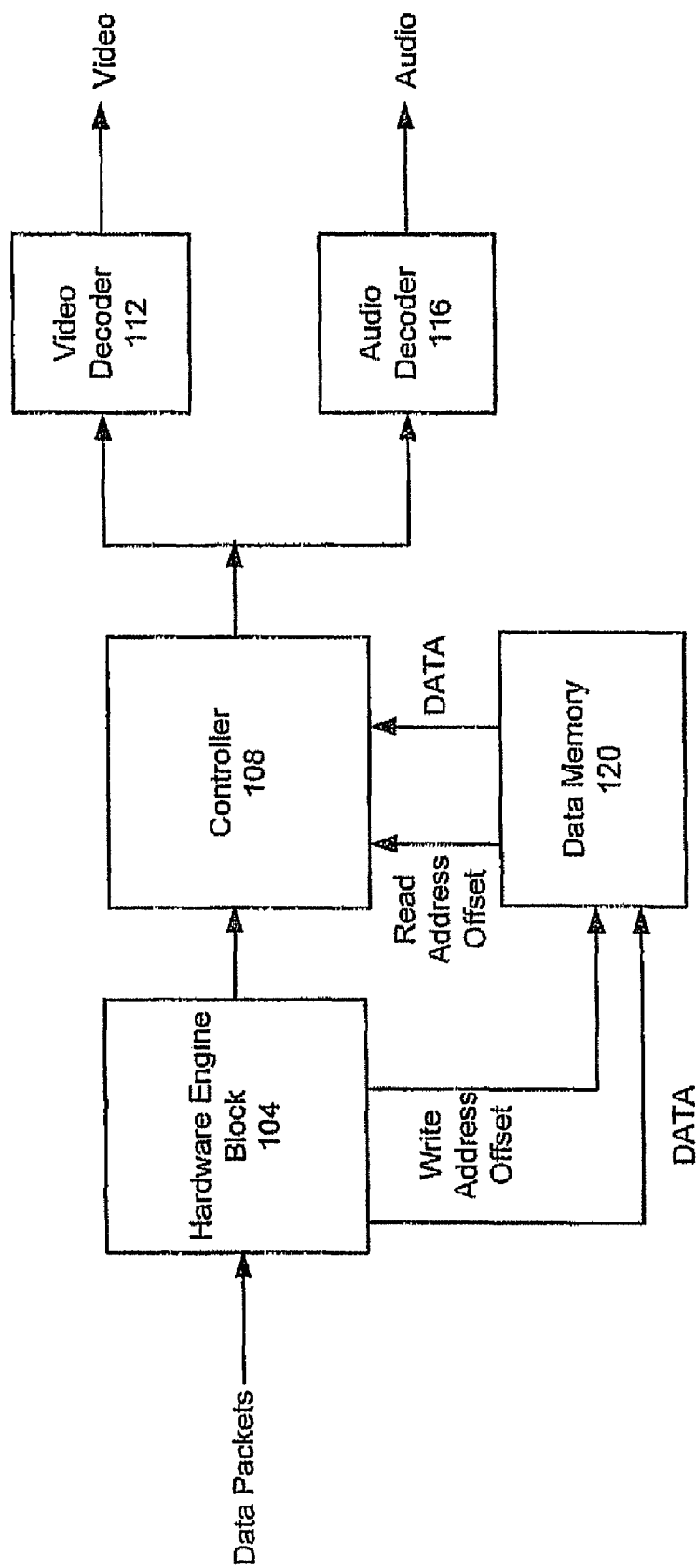
FIG. 1 is a navigation hardware assist system (NHAS) used for receiving and decoding multimedia data packets received by a set-top-box, in accordance with an embodiment of the invention.

Various aspects of the invention provide at least a system and method of increasing the speed in which data packets are processed in a set-top-box. Various aspects of the invention may provide support and assistance to firmware that is used for processing one or more data packets. The data packets may comprise multimedia data received from a multimedia service provider. These data packets may be stored in a memory of the above referenced system for future use by the firmware. Various aspects of the invention effectively determine where certain data within a data packet of a data stream may be found within the memory. In a representative embodiment, the start and/or end locations of the certain data may be addressed by the firmware using one or more address offsets that are generated by a programmable data processing system residing within the set-top-box. These address offsets are stored into the memory for use by the firmware during processing. The firmware may flexibly access and utilize the one or more address offsets from the memory in order to facilitate optimum processing by the data processing system. In a representative embodiment, the start and/or end locations of data within a particular field may be specified in memory using corresponding address offsets. The address offsets may be used by the firmware to index the start and/or end locations in the memory wherein the certain data of one or more data packets may be found. The certain data may correspond to data found in a particular field of a data packet, for example. By using these address offsets, data corresponding to a field within a packet, for example, may be referenced from the first data byte or the beginning of a received packet. In other words, these address offsets are referenced from the starting byte location or a base address of a data packet. The base address may be programmed to a particular address value. During packet processing, the firmware may efficiently access these address offsets using a portion of the memory. In a representative embodiment, the address offsets and received packet data may be sequentially stored in different portions of the same memory. In a representative embodiment, an address offset stored in a first portion of memory may be used to effectively address the certain data that is stored within a second portion of the memory. In a representative embodiment, the system that implements the various aspects of the invention resides within the programmable data processing system of a set-top-box that is used for decoding received multimedia data streams. The programmable data processing system may be used to generate the aforementioned one or more address offsets. The above referenced programmable data processing system may be hereinafter termed or referred to as a navigational hardware assist system (NHAS). The programmable data processing system is programmed, operated, and/or configured by way of executing the firmware. In a representative embodiment, the NHAS may comprise the firmware. The multimedia data streams may be provided to the set-top-box from a multimedia service provider, such as a cable TV or satellite operator.

Various aspects of the invention provide a smooth degradation of functionality such that the hardware of the navigation hardware assist system (NHAS) may assist the firmware in varying levels. As newly developed data packet formats arise, the navigational functionality provided by the NHAS may be reduced in favor of data parsing using the firmware. For example, if any received data packets comprise a format in which their headers must be manually parsed to extract data contained in certain fields, the firmware would perform manual parsing. However, the NHAS may provide some assistance, in this instance, by allowing the firmware to index the header start field of a packet where data parsing may begin, for example.

FIG. 1 is a navigation hardware assist system (NHAS) used for receiving and decoding multimedia data packets received by a set-top-box, in accordance with an embodiment of the invention. The NHAS comprises a hardware engine block 104, a controller 108, a video decoder 112, an audio decoder 116, and a data memory 120. The hardware engine block 104 receives data packets provided by a multimedia service provider. The data packets may comprise MPEG packets, DIRECTV packets, or fixed length sections of data within PES, ES, Program Stream, or other arbitrary format packets, for example. Arbitrarily formatted fixed length packets may use a subset of the hardware assist which is not associated with processing a particular format. The hardware engine block 104 processes the received data packets in conjunction with the controller 108 and the data memory 120, such that the packets may be properly prepared for transmission to a video decoder 112 and an audio decoder 116. In a representative embodiment, the controller 108 executes the necessary firmware used for processing the received data packets. The data memory 120 supplies one or more address offsets used by the firmware. The address offsets are used by the firmware to locate and access a certain portion of a data packet stored the data memory 120. The firmware may be executed by the controller 108. The video decoder 112 receives the processed output from the controller 108 and decodes the data such that video is output from the video decoder 112. The video may be transmitted to a monitor for display to a user, for example. The audio decoder 116 receives the processed output from the controller 108 and decodes the data such that audio is output from the audio decoder 116. The audio may be transmitted to an amplifier system that amplifies the signal such that one or more speakers may generate audible sounds to a user, for example. The hardware engine block 104 may analyze and compute one or more address offset values from the incoming received data packets. Subsequently, the one or more address offset values may be written or stored in the data memory 120 for subsequent use by the firmware. The NHAS may be configured such that a data packet is processed by the hardware engine block 104 before the firmware processes the data packet. For example, the hardware engine block 104 may process the incoming data packets one data packet period earlier than the firmware. This one packet period delay may allow the one or more address offset values to be properly stored into the data memory 120 prior to their use by the controller 108 and its firmware. As illustrated in FIG. 1, the hardware engine block 104 generates an address offset that specifies a location within the data memory in which a particular data field within a packet may be found. In a representative embodiment this location may comprise the start and/or end of one or more data fields within a packet. The one or more address offsets may determine the start and end points of certain data within a sub-layer packet within a particular packet. The one or more address offset values are used to quickly index a location (e.g., such as a field within a sub-layer packet) within a packet. These one or more address offset values may be used when the firmware is executed or operated.

As indicated in FIG. 1, the firmware (resident within the controller 108) may read the one or more address offset values to index one or more appropriate location(s) in a data memory. Once obtained by the firmware, the one or more address offset values may be added to a base address to appropriately index one or more locations within a data packet. In a representative embodiment, the one or more address offset values and the data of one or more data packets are stored in the same data memory. A location of the one or more locations, for example, may comprise a starting data byte of a particular field or an ending data byte of a particular field. Various aspects of the invention allow the firmware to utilize the one or more address offset values, such that more efficient indexing and/or processing of data may occur. The one or more address offset values may index any type of field located within a packet of the one or more packets received in a multimedia data stream. In one representative embodiment, the packet may contain one or more sub-layer packets that are encapsulated within one or more layers of a multi-layer packet. In a representative embodiment, the one or more address offset values may specify the ending location byte of adaptation field data. In another representative embodiment, the one or more address offset values may specify the location at which certain one or more data patterns within a packet may be identified. The NHAS may be appropriately programmed using the firmware such that the one or more data patterns may be identified.

Figure 2:
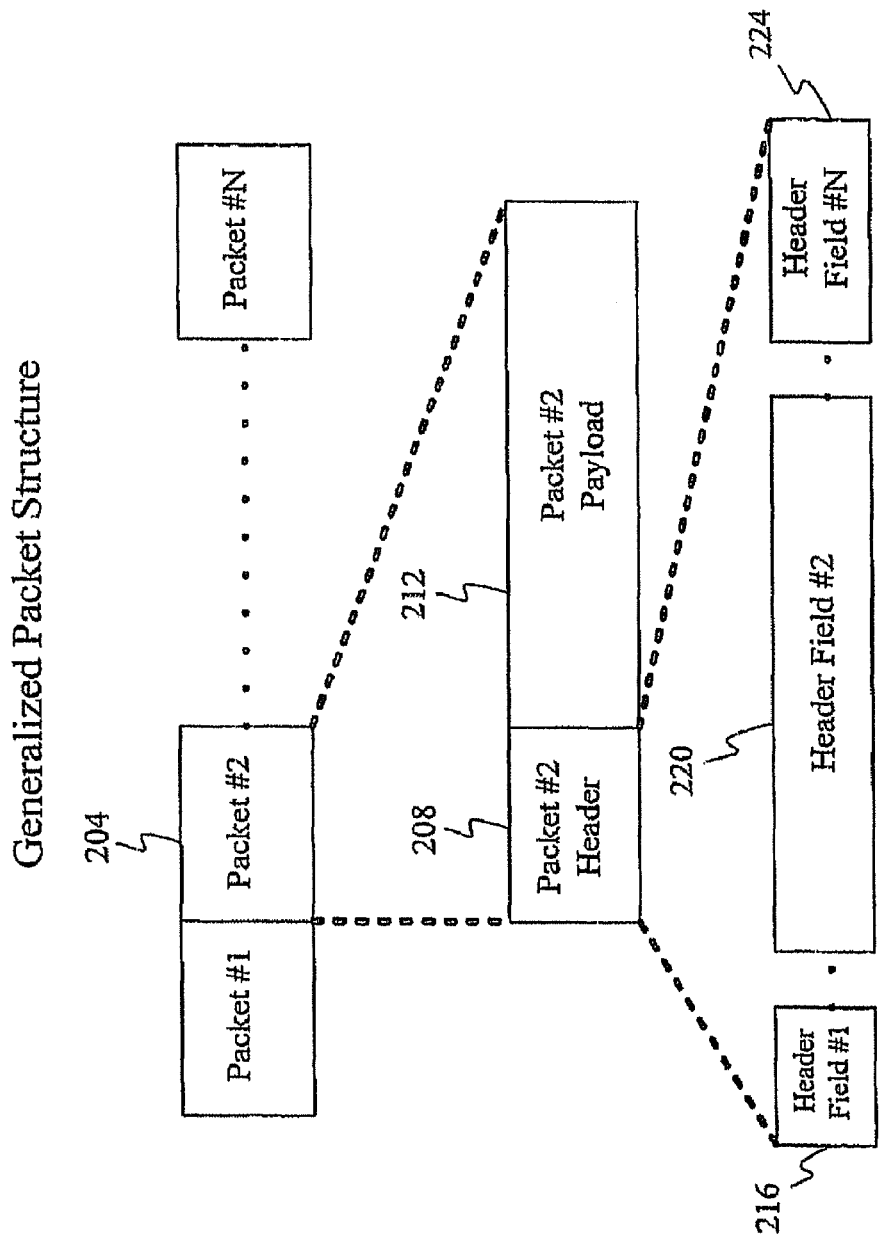
FIG. 2 is a relational block diagram describing a structure of an exemplary packet of the one or more multimedia data packets received by the NHAS embodiment described in relation to FIG. 1.

FIG. 2 is a relational block diagram describing a structure of an exemplary packet of the one or more multimedia data packets received by the NHAS embodiment described in relation to FIG. 1. As illustrated, Packet #2 204 represents the second packet of a multimedia data stream containing N packets. Packet #2 204 comprises a Packet #2 Header 208 and a Packet #2 Payload 212. The Packet #2 Header comprises a number of header fields 216, 220, 224. The last header field comprises Header Field #N 224. For example, Header Field #1 216 may comprise data providing packet identification information while Header Field #2 220 may comprise data providing packet length information. The Packet #2 Payload 212 may comprise one or more "sub-layer packets".

Figure 3:
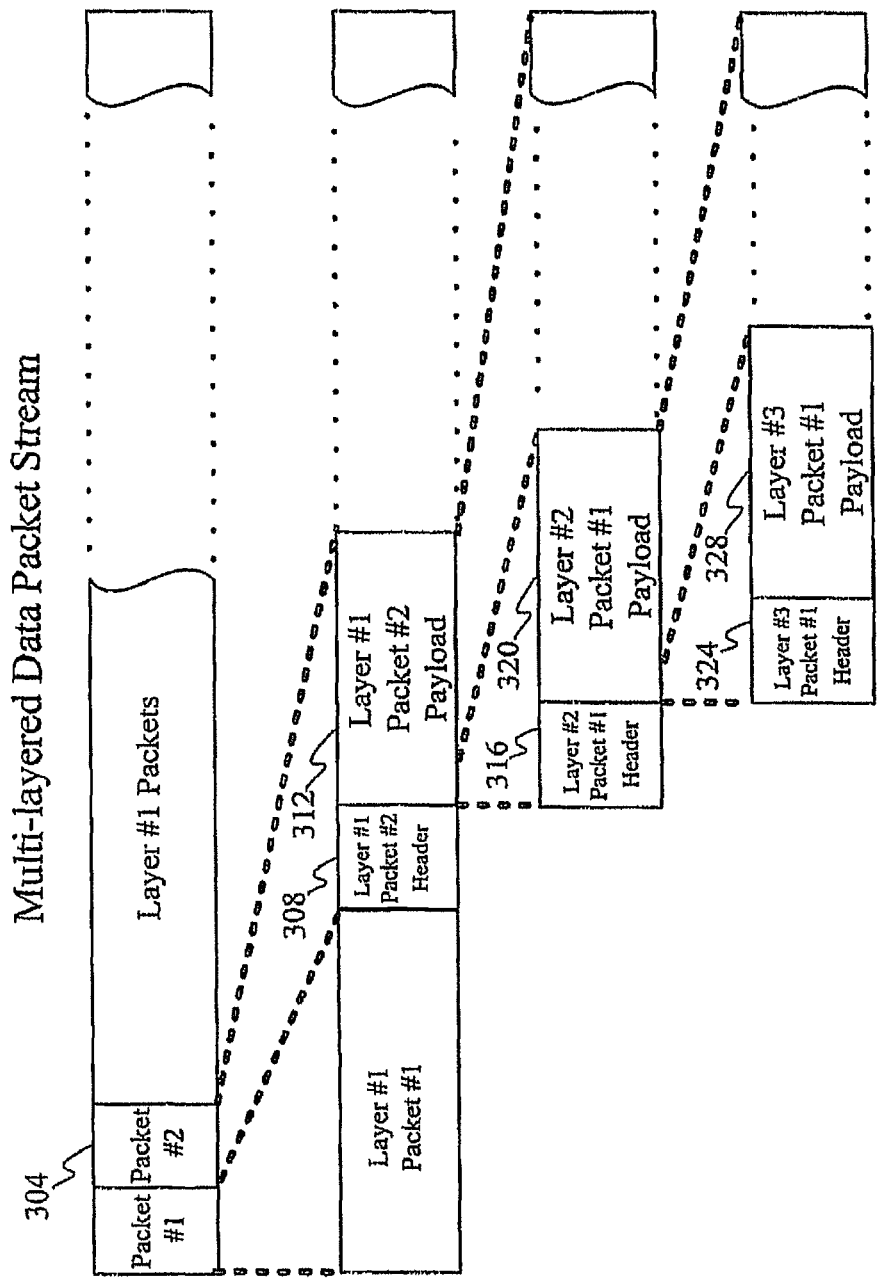
FIG. 3 is a relational block diagram describing a typical structure of a packet within a multi-layered data packet stream.

FIG. 3 is a relational block diagram describing a typical structure of a packet within a multi-layered data packet stream. The multi-layered data packet stream may be received by the NHAS embodiment described in relation to FIG. 1. FIG. 3 illustrates 3 packet layers. As diagrammed in FIG. 3, Packet #2 304 of the multi-layered data packet stream may comprise a Layer #1 Packet #2 Header 308 and a Layer #1 Packet #2 Payload 312. In this exemplary representation, the Layer #1 Packet #2 Payload begins with a "sub-layer packet" described as Layer #2 Packet #1. The Layer #2 Packet #1 comprises a header and a payload, described as Layer #2 Packet #1 Header 316 and Layer #2 Packet #1 Payload 320, respectively. The Layer #2 Packet #1 Payload 320 may begin with a packet described as Layer #3 Packet #1, as shown. The Layer #3 Packet #1 comprises a Layer #3 Packet #1 Header 324 and a Layer #3 Packet #1 Payload 328. Although not illustrated, each of the headers at each layer (i.e., layer #1, layer #2, or layer #3) may comprise one or more fields. Referring to FIG. 1, the hardware engine block of the NHAS may process the multi-layered data packet stream to generate address offset values related to the start and/or end of one or more fields or payloads of the one or more packets in the multi-layered data packet stream. When the firmware is operated or executed, the address offset values are used to navigationally assist the firmware in accessing certain data within a data packet, thereby improving the data processing performance of its corresponding set-top-box. In the multi-layered data packet stream diagram of FIG. 3, the packets in layers 2 and 3 may be described as "sub-layer packets" while the packets in layer 1 may be described as "packets".

Figure 4:
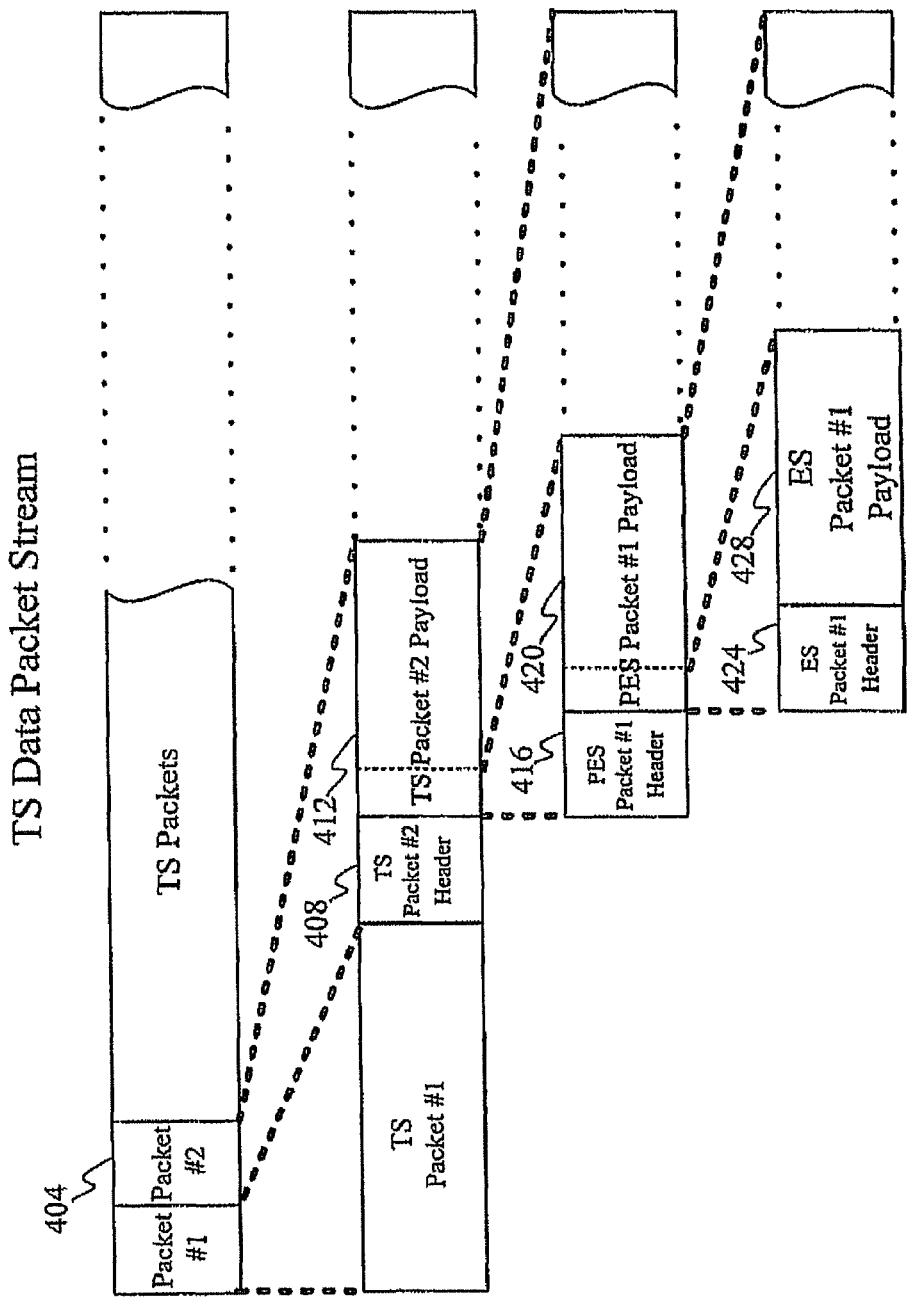
FIG. 4 is a relational block diagram illustrating a typical structure of a TS (transport stream) data packet stream that may be received by the hardware engine block described in FIG. 1.

FIG. 4 is a relational block diagram illustrating a typical structure of a TS (transport stream) data packet stream that may be received by the hardware engine block described in FIG. 1. Transport streams are utilized in MPEG transmission or DIRECTV transmission, as well known by one of ordinary skill in the art. In relation to FIG. 3, the TS packets correspond to packets in Layer #1, the PES (packetized elementary stream) packets correspond to packets in Layer #2, and the ES (elementary stream) packets correspond to packets in Layer #3. Packet #2 404 is used as an exemplary packet for the purposes of discussing the structure of a TS packet. Packet #2 404 comprises a TS Packet #2 Header 408 and a TS Packet #2 Payload 412. As shown, the first portion of the TS Packet #2 Payload 412 comprises a PES packet. The PES packet comprises a PES Packet #1 Header 416 and a PES Packet #1 Payload 420. As shown, the first portion of the PES Packet #1 Payload 420 comprises an ES packet. The ES packet comprises an ES Packet #1 Header 424 and an ES Packet #1 Payload 428. Each of the TS, PES, and ES headers may comprise one or more fields. For example, the fields may comprise data that indicates the starting and/or ending data byte(s) of subsequent PES packets, ES packets, and payload data. The fields may comprise data that provides the start code prefixes and timestamp information of one or more data packets. As discussed in FIG. 3, one or more fields in each of the headers of each layer (i.e., TS layer, PES layer, and ES layer) may be indexed by way of using the NHAS described in FIG. 1.

Figure 5:
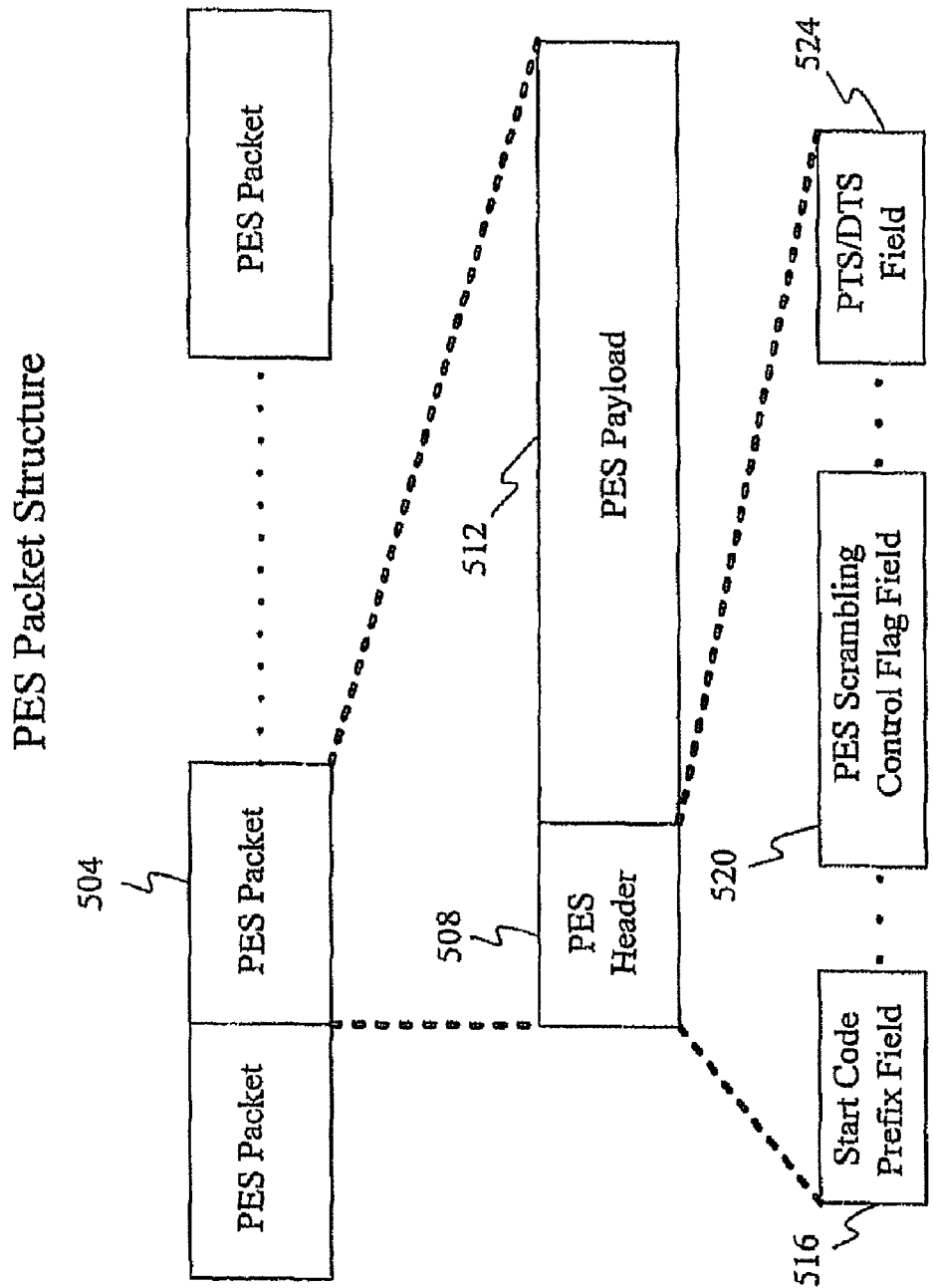
FIG. 5 is a relational block diagram illustrating a typical structure of a PES packet as may be used by the NHAS described in FIG. 1.

FIG. 5 is a relational block diagram illustrating a typical structure of a PES packet as may be used by the NHAS described in FIG. 1. As shown, a PES packet 504 may comprise a PES header 508, and a PES payload 512, for example. The PES header 508 comprises a number of fields such as a start code prefix field 516, a PES scrambling control flag field 520, and a PTS/DTS (presentation time stamp/decode time stamp) field 524, for example. The NHAS may process the PES packets such that the locations of these fields 516, 520, 524 may be provided to the firmware using the hardware engine block described in reference to FIG. 1. The firmware is provided a navigational assist when necessary. The navigational assist functionality may be flexibly and gradually increased or attenuated based on the type of data packets received by the NHAS. Furthermore, the firmware may be used to manage the gradual decrease or increase in use of the assist functionality provided by the NHAS. The firmware may selectively determine the level of data indexing performed by the navigational hardware assist system (NHAS), depending on a particular application's requirements. For example, a particular application may require a minimum level of indexing provided by the NHAS only at the transport stream (TS) level. Furthermore, it is contemplated that a circuitry within the hardware engine block may be used to manage the gradual decrease or increase in the navigational assist functionality automatically.

Figure 6:
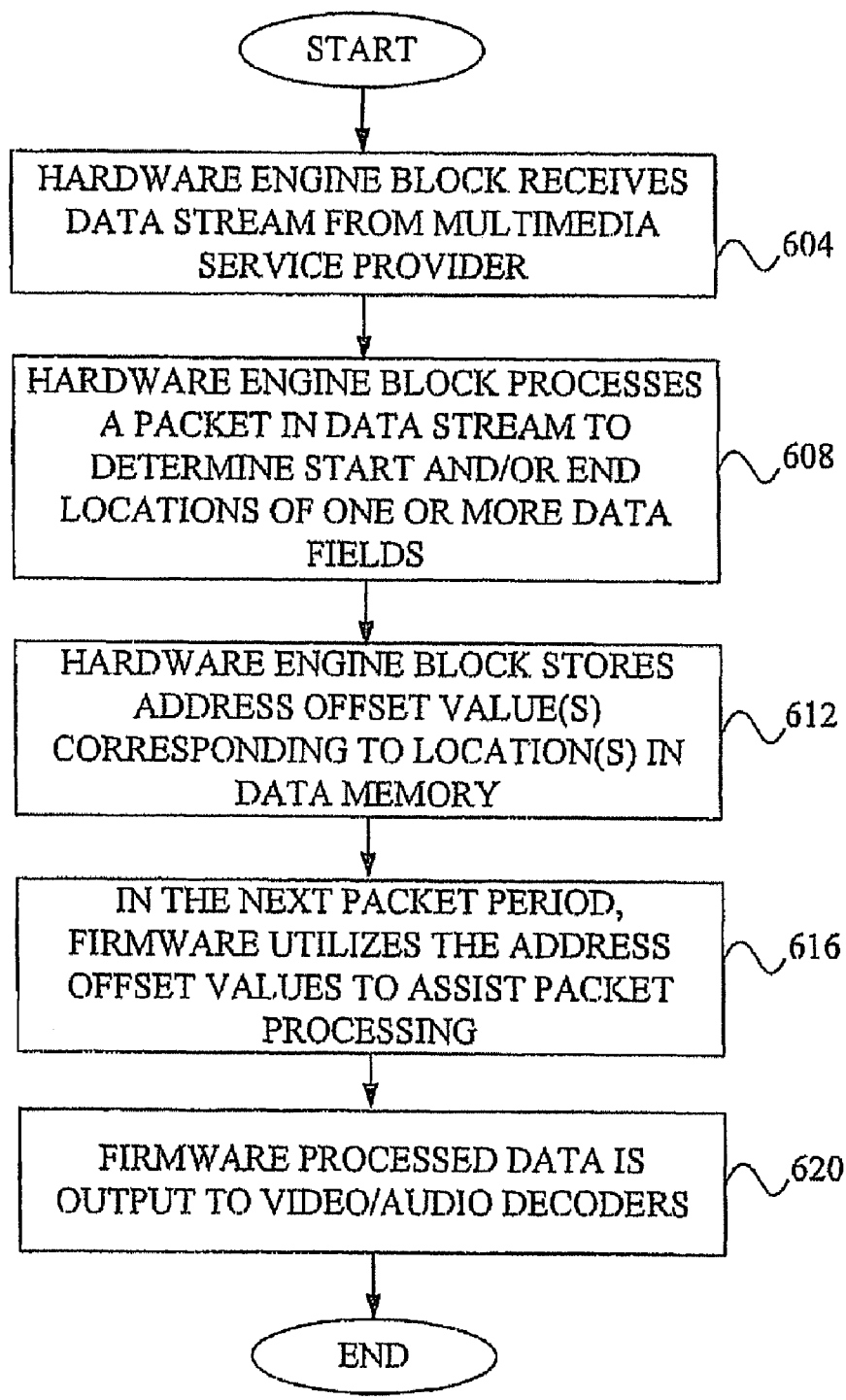
FIG. 6 is an operational flow diagram that describes the operation of the navigational hardware assist system (NHAS) previously described in FIG. 1, in accordance with an embodiment of the invention.

FIG. 6 is an operational flow diagram that describes the operation of the navigational hardware assist system (NHAS) previously described in FIG. 1, in accordance with an embodiment of the invention. At step 604, the hardware engine block receives a data stream from a multimedia service provider. The data stream may comprise a multi-layer data stream such as a TS (transport stream) data stream that encapsulates PES packets. The PES packets, in turn, may encapsulate ES packets. Next, at step 608, the hardware block processes a received packet of the data stream to determine one or more address offset values. The address offset values are used to index start and/or end locations of one or more data fields, for example. Next, at step 612, the hardware engine block stores the one or more address offset values corresponding to the start and/or end location(s) into a data memory (as previously described in FIG. 1). In the next packet period, at step 616, the firmware utilizes the address offset values to assist and speed up the processing of the data packets received. Depending on the type of data received and/or application, and by way of control provided by the controller, the firmware may utilize any one of the one or more address offset values to access data (e.g., such as a particular field within a data packet) stored in the data memory. Thereafter, at step 620, the controller outputs the data processed by the firmware into video and audio decoders, such that the video and audio may be properly presented to a user.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system comprising:
a first hardware for:
  receiving one or more multi-layered packets,
  storing data into a memory, said data obtained from a field of one or more fields of said one or more multi-layered packets, and
  generating one or more offset values; and
a second hardware for executing a firmware, wherein said firmware is used for processing said one or more multi-layered packets by accessing said one or more offset values provided by said first hardware, said one or more offset values used by said firmware to assist in one or both of:
  indexing said field of said one or more fields within said one or more multi-layered packets; and
  locating said field of said one or more fields within said one or more multi-layered packets.

2. The system of claim 1 wherein said memory is further used for storing said one or more offset values generated by said first hardware.

3. The system of claim 1 wherein said one or more multi-layered packets comprises packetized elementary stream (PES) packets.

4. The system of claim 1 wherein said one or more multi-layered packets comprises elementary stream (ES) packets.

5. The system of claim 1 wherein said one or more offset values is used to specify the starting and/or ending location(s) of payload data of said one or more multi-layered packets.

6. The system of claim 1 wherein said data comprises start code information.

7. The system of claim 1 wherein said data comprises timestamp information.

8. The system of claim 1 wherein said multi-layered packets comprises DIRECTV packets.

9. The system of claim 1 wherein said multi-layered packets comprises transport stream (TS) packets and wherein said sub-layer packets comprise packetized elementary stream (PES) packets.

10. A method for processing data packets comprising:
  receiving one or more multi-layered packets,
  storing data into a memory, said data obtained from a field of one or more fields of said one or more multi-layered packets, and
  generating one or more offset values; and
  executing a firmware, wherein said firmware is used for processing said one or more multi-layered packets by accessing said one or more offset values, said one or more offset values used by said firmware to assist in one or both of:
    indexing said field of said one or more fields within said one or more multi-layered packets; and
    locating said field of said one or more fields within said one or more multi-layered packets.

11. The method of claim 10 wherein said memory is further used for storing said one or more offset values.

12. The method of claim 10 wherein said one or more multi-layered packets comprises packetized elementary stream (PES) packets.

13. The method of claim 10 wherein said one or more multi-layered packets comprises elementary stream (ES) packets.

14. The method of claim 10 wherein said one or more offset values is used to specify the starting and/or ending location(s) of payload data of said one or more multi-layered packets.

15. The method of claim 10 wherein said data comprises start code information.

16. The method of claim 10 wherein said data comprises timestamp information.

17. The method of claim 10 wherein said multi-layered packets comprises DIRECTV packets.

18. The method of claim 10 wherein said multi-layered packets comprises transport stream (TS) packets and wherein said sub-layer packets comprise packetized elementary stream (PES) packets.

19. A system for processing data packets comprising:
  one or more circuits operable for, at least:
    receiving one or more multi-layered packets,
    storing data into a memory, said data obtained from a field of one or more fields of said one or more multi-layered packets, and
    generating one or more offset values; and
    executing a firmware, wherein said firmware is used for processing said one or more multi-layered packets by accessing said one or more offset values, said one or more offset values used by said firmware to assist in one or both of:
      indexing said field of said one or more fields within said one or more multi-layered packets; and
      locating said field of said one or more fields within said one or more multi-layered packets.

20. The system of claim 19 wherein said memory is further used for storing said one or more offset values.

21. The system of claim 19 wherein said one or more multi-layered packets comprises packetized elementary stream (PES) packets.

22. The system of claim 19 wherein said one or more multi-layered packets comprises elementary stream (ES) packets.

23. The system of claim 19 wherein said one or more offset values is used to specify the starting and/or ending location(s) of payload data of said one or more multi-layered packets.

24. The system of claim 19 wherein said data comprises start code information.

25. The system of claim 19 wherein said data comprises timestamp information.

26. The system of claim 19 wherein said multi-layered packets comprises DIRECTV packets.

27. The system of claim 19 wherein said multi-layered packets comprises transport stream (TS) packets and wherein said sub-layer packets comprise packetized elementary stream (PES) packets.

* * * * *